United States Patent [19]

Mullett

[11] 4,004,228

[45] Jan. 18, 1977

[54] PORTABLE TRANSMITTER

[75] Inventor: Charles E. Mullett, Los Angeles, Calif.

[73] Assignee: Integrated Electronics, Ltd., Hong Kong

[22] Filed: Apr. 29, 1974

[21] Appl. No.: 465,335

[52] U.S. Cl. .............................. 325/113; 325/119; 343/702

[51] Int. Cl.² ........................................ H04B 1/034

[58] Field of Search ............ 325/16, 119, 111–113, 325/160, 178, 118; 340/273, 274 R, 276, 277, 282, 283, 307, 308, 421, 224; 317/101 R, 101 A, 101 B, 101 C, 101 CP; 343/702, 868, 788, 873

[56] References Cited

UNITED STATES PATENTS

| 3,049,711 | 8/1962 | Hooper | 343/702 |
|---|---|---|---|
| 3,274,588 | 9/1966 | Brown | 325/105 |
| 3,428,896 | 2/1969 | Schweitzer, Jr. | 325/119 |
| 3,453,546 | 7/1969 | Fryer | 325/118 |
| 3,538,441 | 11/1970 | Tanaka | 343/702 |
| 3,742,478 | 6/1973 | Johnson | 340/224 |
| 3,778,836 | 12/1973 | Tanaka | 343/702 |
| 3,780,373 | 12/1973 | Holst et al. | 343/873 |

Primary Examiner—Robert L. Griffin
Assistant Examiner—Jin F. Ng
Attorney, Agent, or Firm—Edward D. O'Brian

[57] ABSTRACT

A portable transmitter intended to be used to broadcast a signal in response to an external actuation can be constructed so as to include a board such as a so-called printed circuit board carrying a metal coil serving as an antenna. This coil surrounds a central region of the board carrying the operative components of the transmitter other than the antenna and carrying as much excess metal as can be conveniently located generally within the antenna. With this structure, the components and any metal located as described serve as capacitance adjacent to the antenna. As a consequence of the structure the effect of any capacitance adjacent to the exterior of the transmitter is minimized so as to improve antenna performance. When the antenna forms a part of an oscillator circuit in the transmitter so as to determine the oscillator frequency this structure minimizes the effect of any capacitance external to the transmitter affecting the oscillator frequency.

3 Claims, 7 Drawing Figures

PORTABLE TRANSMITTER

BACKGROUND OF THE INVENTION

The invention set forth in this specification primarily relates to small portable transmitters which are primarily intended to be used to broadcast a signal in response to what is referred to herein as "external actuation."

This term "external actuation" is employed in this specification to designate any of a large number of different items such as movement of a transmitter, movement of an object adjacent to a transmitter, undue heat, or vibration. It is frequently desirable to utilize portable transmitters which are sensitive to one or more such external actuations in the sense that they will broadcast a signal in response to such external actuation in various alarm type applications. Thus, for example, portable transmitters which are responsive to such actuations can be mounted on or adjacent to doors, windows, floor mats, or the like in order to detect intrusions such as normally accompany a burglary. These portable transmitters may also, however, be utilized to detect a fire or some other physical condition and to broadcast a signal indicating the presence of a fire or such other condition.

Portable transmitters for these applications preferably are comparatively small units of a self-contained character. When portable transmitters as indicated are relatively small in dimension and carry a small battery as a power supply they may be easily used in a number of different ways. It is presently considered most preferable to utilize these units by adhering them through the use of tape or other related mounting means in various operative locations. The portable transmitters of the present invention are to be utilized in this manner. They preferably are constructed as small packages having flat mounting surfaces which can be easily transported and installed.

It is commonly considered that comparatively small portable transmitters are inherently somewhat limited in their performance characteristics because of their size. One factor which is related to this involves the efficiency of an antenna incorporated within a portable transmitter as indicated. It is normally desired that any antenna used have an effective radiant pattern and that such an antenna be capable of broadcasting an RF signal over as large an area as reasonably possible per unit of power consumed. This problem of providing suitable antennas for use in small portable transmitters is further complicated because of the need to utilize simple metal coil or loop antennas in these units because of economic as well as constructional considerations.

SUMMARY OF THE INVENTION

A broad objective of the present invention is to provide new and improved relatively small portable transmitters which are intended to be utilized to broadcast a signal in response to an appropriate external actuation. A related object of the present invention is to provide transmitters as indicated which employ a comparatively effective, yet reasonably inexpensive, antenna system. More specifically, the invention is directed towards transmitters as indicated which may be easily and conveniently constructed at a comparatively nominal cost and which effectively broadcast a signal when actuated.

These various objectives of the invention are achieved in a portable transmitter which is intended to be utilized to broadcast a signal when actuated having an actuation means for causing the operation of the transmitter, an oscillator means for generating an RF signal in response to the actuation of the actuation means, and an antenna for radiating a signal so generated, by the improvement which comprises: the transmitter including a board, said antenna comprising a metal coil on one side of the board adjacent to the exterior of the board, the components of the actuator means and the oscillator means being located within the perimeter of the coil on the board, these components serving as a capacitance adjacent to the antenna which minimizes the effects of any stray capacitance adjacent to the transmitter so that the antenna will radiate effectively.

BRIEF DESCRIPTION OF THE DRAWING

Unfortunately, a summary such as the preceding inherently has certain limitations. The invention is best more fully indicated with reference to the remainder of this specification, the appended claims, and the accompanying drawing in which:

Figure 1:
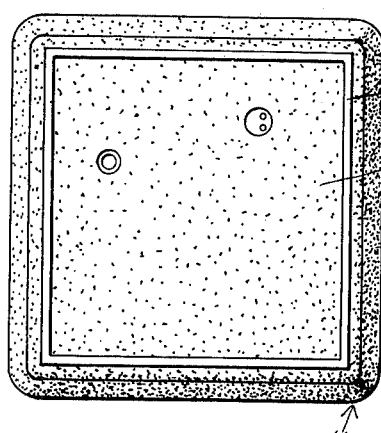
FIG. 1 is a front-elevational view of a presently preferred embodiment or form of a portable transmitter in accordance with this invention.
Figure 2:
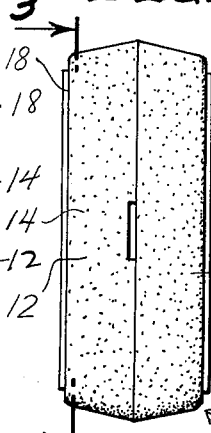
FIG. 2 is a side-elevational view of the transmitter shown in FIG. 1.

The transmitter illustrated is a particular device utilizing the essential concepts or features of this invention set forth in the appended claims. Because of the nature of these concepts they can be utilized in a number of somewhat differently appearing and somewhat differently constructed transmitters through the exercise of routine skill in the electronic field.

DETAILED DESCRIPTION

In the drawing there is shown a portable transmitter 10 in accordance with this invention which is constructed so as to utilize two electronical non-conductive plastic shells 12 which fit together in a known manner in order to find a housing for this transmitter 10. This housing includes flat front and rear surfaces 14 and 16, respectively, which are surrounded by small peripheral flanges 18. These surfaces 14 and 16 are considered desirable because they facilitate the transmitter 10 being mounted upon an appropriate supporting surface such as, for example, a window surface through the use of a double sided adhesive tape.

Figure 3:
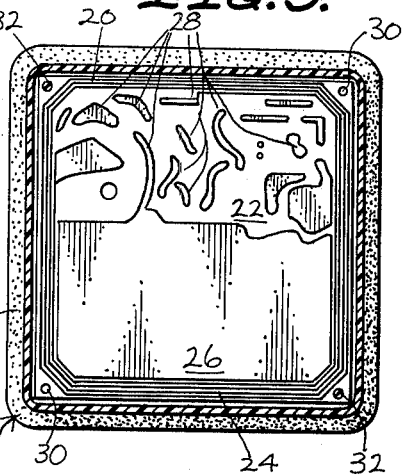
FIG. 3 is a cross-sectional view taken at line 3—3 of FIG. 2.
Figure 5:
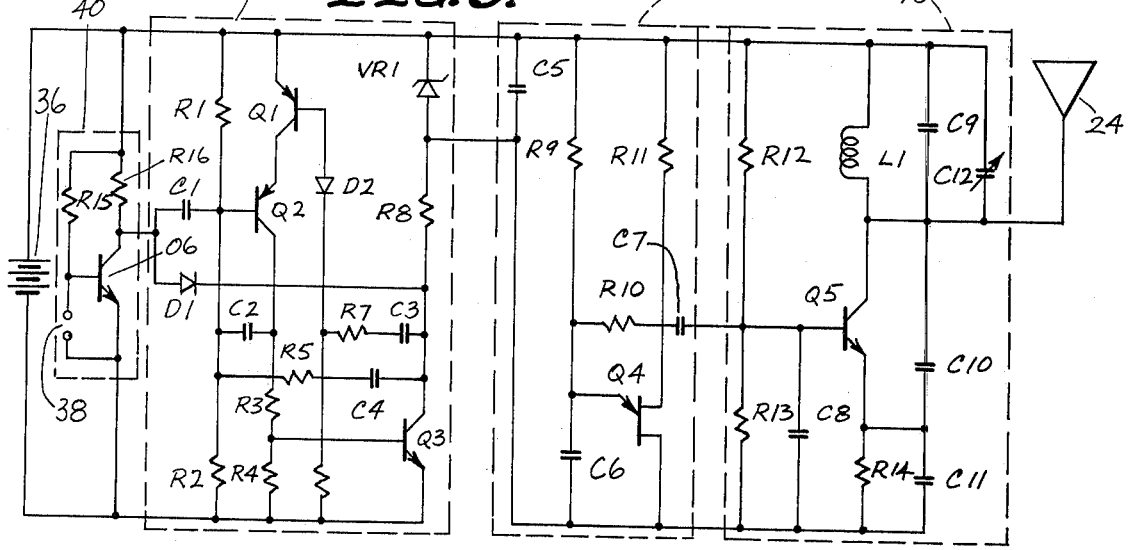
FIG. 5 is a schematic view of the circuit employed in this transmitter.

The shells 12 serve to hold between them a flat, conventional electrically non-conductive printed circuit board 20. This printed circuit board 20 has a back surface 22 as illustrated in FIG. 3 of the drawing. This surface 22 is provided with an electrically conductive metal coil 24 constituting an antenna for the transmitter 10. For convenience of reference this coil 24 is occasionally referred to as the antenna 24 in the remainder of this specification. This coil 24 is located generally at the periphery of the surface 22. This coil 24 surrounds a large centrally located metal area 26 on the surface 22 and various appropriate solder connections 28 which are used in connecting up various parts as shown in FIG. 5 on the side of the board 20 which is not illustrated. If desired, small mounting holes 30 for engagement with support pins 32 may be located at the corners of the board 20.

Figure 4:
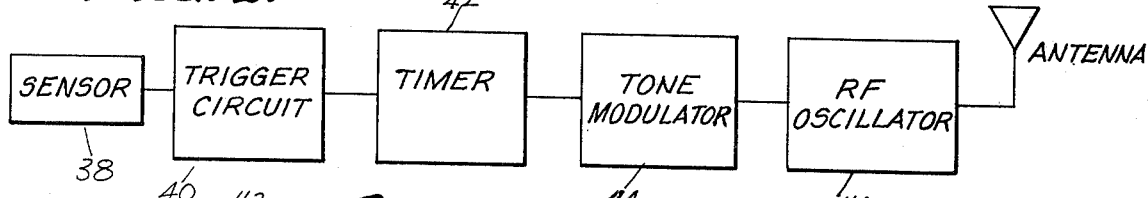
FIG. 4 is a block diagram of the circuit employed in the illustrated transmitter.

The transmitter 10 utilizes various circuit elements or "blocks" as indicated in FIGS. 4 and 5 of the drawing. From these figures it will be apparent that the transmitter 10 includes a battery 36 which is used to supply power for the operation of the transmitter 10. The transmitter 10 also includes a sensor 38 serving as an "actuation means", which forms a part of a trigger circuit 40. This trigger circuit 40 is connected to a timer circuit 42 and the timer circuit 42 is connected to a tone modulator circuit 44. The latter is connected to a radio frequency oscillator circuit 46 which is technically connected to the antenna defined by the coil 24 indicated in the preceding discussion. It is to be noted, however, that the particular oscillator circuit 46 in effect includes the antenna 24 as a part of this oscillator circuit 46 in the sense that the electrical characteristics of the coil 24 in part determine the frequency at which the oscillator circuit 46 operates.

It would be possible to encumber this specification with a prolonged, detailed discussion of all of the individual components which are utilized in the trigger circuit 40, the timer circuit 42, the tone modulator circuit 44, and the RF oscillator circuit 46 as illustrated in FIG. 5. It is considered that it is unnecessary to describe the components of these circuits in detail. Since circuits of the type employed are well known and are conventional it is believed that anyone skilled in the electronics field will have no difficulty in reproducing a transmitter 10 in accordance with this invention by referring to the circuit components illustrated in FIG. 5.

Figure 6:
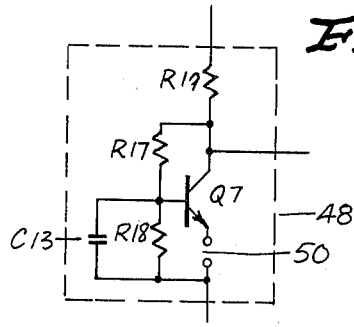
FIGS. 6 and 7 are schematic views showing alternate sensors and trigger circuits capable of being utilized with this invention.
Figure 7:
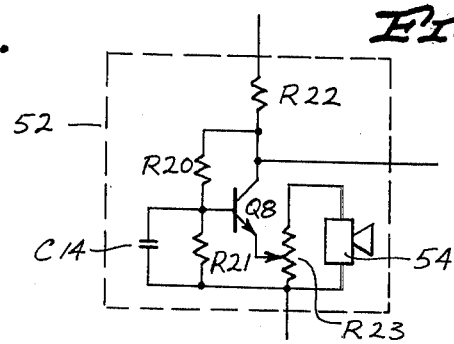

In the particular circuit illustrated in FIG. 5 the sensor 38 is intended to be a normally closed reed switch for use in detecting door and window intrusions and the like incorporated within the trigger circuit 40. However, if desired, an alternative trigger circuit 48 as illustrated in FIG. 6 of the drawing can be substituted for the trigger circuit 40. This trigger circuit 48 includes a switch 50 which is normally open. Such a switch 50 may be of a character to detect physical motion or may be of a known character capable of detecting the presence of a heat rise caused by a fire. Also, a trigger circuit 52 as illustrated in FIG. 7 may be substituted for the trigger circuit 40. This trigger circuit 52 utilizes as a sensor 54 a magnetic earphone cartridge which will detect vibration. This type of a sensor is particularly desirable when the transmitter 10 is to be mounted on a window.

All of these various trigger circuits 40, 48, and 52 operate in substantially the same manner so as to supply a signal to the timer circuit 42. This timer circuit 42 is primarily utilized because of certain legal requirements limiting how often a transmitter such as the transmitter 10 can be operated to give off a signal when utilized as an alarm detector or the like. The function of the timer circuit 42 is to actuate the tone modulator circuit 44 so that it in turn sets an audio frequency which is passed to the oscillator circuit 46. This oscillator circuit 46 acts in an established manner so as to provide a radio frequency signal to the antenna 24.

As a consequence of this mode of operation, the transmitter 10 will send out at intervals determined by the timer a radio frequency signal which is frequency-modulated at a specific audio frequency. Such an audio frequency can be varied by varying the value of the resistor R9 shown in FIG. 5. The radio frequency can also be varied through the adjustment of the capacitor C12 in the RF oscillator circuit 46. By such variation in the audio frequency of a signal and in the radio frequency of a signal, it is possible to utilize a plurality of the transmitters 10 in an area where the signals given off by the antennas 24 of these transmitters 10 overlap and to construct an appropriate receiver for determining which of these transmitters 10 is operating at a particular time.

The operation of the transmitter 10 in radiating from the coil 24 is considered quite important to this invention. Because of the area 26 of metal within the coil 24 and because the various individual components indicated are mounted on the board 20 generally within the coil 24, the transmitter 10 radiates a signal quite effectively. Those items within the coil or antenna 24 serve as a capacitance located adjacent to and within the antenna 24 so as to minimize the effect of any capacitance which may be located adjacent to the transmitter 10 in any location where the transmitter 10 is used, so that the antenna 24 radiates effectively.

This is quite important in the transmitter 10 in providing an inexpensive, effective device which is relatively insensitive to the presence of capacitance surrounding the exterior of the antenna 24 or located adjacent to the exterior of the antenna 24. In addition, with the particular circuits illustrated such stray capacitance located exteriorly of the coil 24 also will not significantly effect the frequency of the oscillator circuit 46. This latter is important since, as pointed out in the preceding, the coil 24 constituting the antenna affects the frequency of operation of the oscillator circuit 46.

I claim:

1. A portable transmitter intended to be used to broadcast a signal when actuated, said transmitter having an actuation means for use in causing the operation of said transmitter, an oscillator means for generating an RF signal in response to the actuation of said actuation means, and an antenna for radiating a signal generated by said oscillator means, in which the improvement comprises:

said transmitter including a flat, electrically non-conductive board, said antenna consisting of a single electrically conductive coil located on said board adjacent to the periphery of said board and extending around the center area of said board, said antenna forming a part of said oscillator means and determining the frequency of operation of said oscillator means, the components of said actuator means and said oscillator means being located within the interior of said coil on said board and being supported on said board, electrical conductor means located on and supported by said board connecting the ends of said coil to said oscillator means, said components serving as capacitances adjacent to said antenna and within the interior of said antenna which minimizes the effect of any capacitance adjacent to the exterior of said transmitter in any location where said transmitter may be located so that said antenna will radiate effectively, said capacitances within said coil also serving to minimize the effect of any stray capacitances on the frequency of operation of said oscillator means.

2. A portable transmitter as claimed in claim 1 wherein:

a body of metal unattached to said components is located on said board within the interior of said coil so as to further serve as a capacitance adjacent to and within the perimeter of said coil.

3. A portable transmitter as claimed in claim 1 wherein:

a body of metal unattached to said components is located on said board within the interior of said coil so as to further serve as a capacitance adjacent to and within the perimeter of said coil, said transmitter includes a non-conductive housing located around said actuation means, said oscillator means, said antenna and said board, said housing serving to space said antenna from any capacitances adjacent to said transmitter so as to further minimize the effect of any capacitances adjacent to said transmitter.

* * * * *